C. DOWNS, R. A. BELLWOOD AND T. W. TURNILL.
METHOD OR PROCESS OF EXTRACTING OIL FROM VEGETABLE SEEDS, NUTS, AND THE LIKE.
APPLICATION FILED JAN. 21, 1919.
1,338,909.  
Patented May 4, 1920.  
2 SHEETS—SHEET 1.
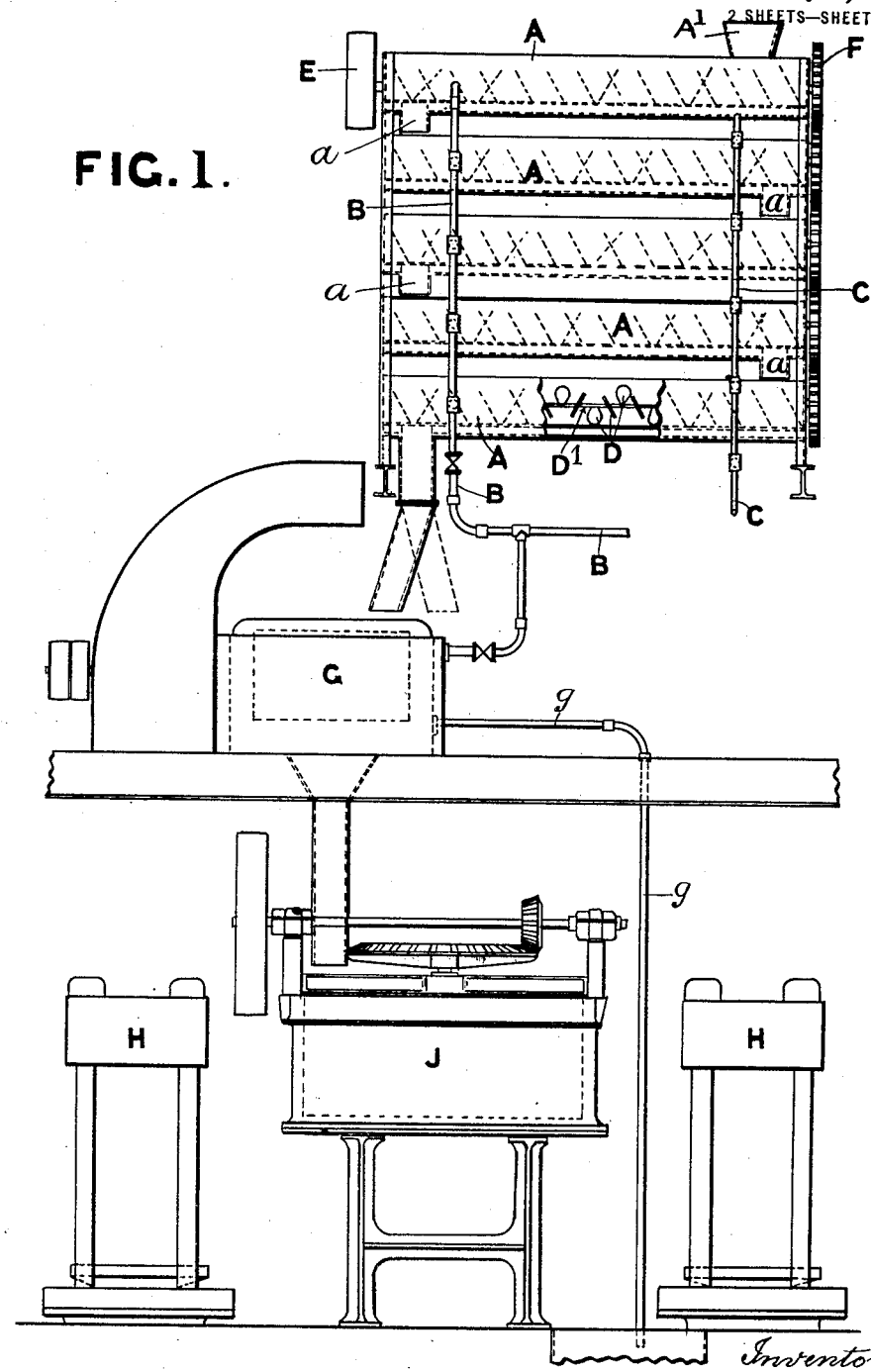

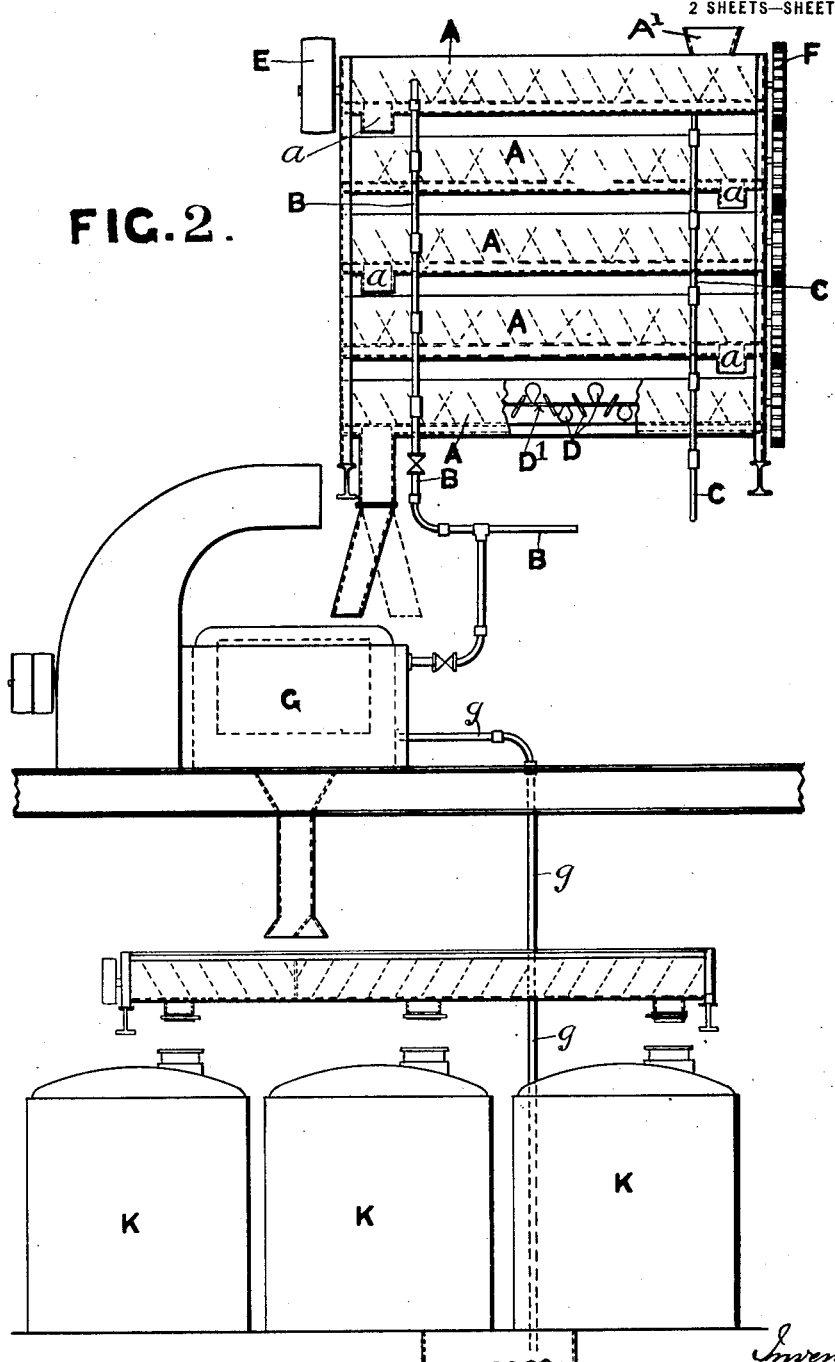

UNITED STATES PATENT OFFICE.

CHARLES DOWNS AND ROBERT ASPLAND BELLWOOD, OF KINGSTON-UPON-HULL, AND THOMAS WILLOUGHBY TURNILL, OF COTTINGHAM, NEAR KINGSTON-UPON-HULL, ENGLAND.

METHOD OR PROCESS OF EXTRACTING OIL FROM VEGETABLE SEEDS, NUTS, AND THE LIKE.

1,338,909.     Specification of Letters Patent.     Patented May 4, 1920.

Application filed January 21, 1919. Serial No. 272,379.

*To all whom it may concern:*

Be it known that we, CHARLES DOWNS and ROBERT ASPLAND BELLWOOD, residing at Kingston-upon-Hull, and THOMAS WILLOUGHBY TURNILL, residing at Cottingham, near Kingston-upon-Hull, in the county of York, England, subjects of the King of Great Britain, have invented certain new and useful Improvements in Methods or Processes of Extracting Oil from Vegetable Seeds, Nuts, and the like, of which the following is a specification.

This invention relates to extracting oil from seeds and nuts similar to copra and palm kernels; and it consists of a novel method of treating the material as hereinafter fully described and claimed.

In its broad essentials, our improved method or process consists of cooking or heating the seeds or the like (which have been previously crushed or cut up, as the case may be) by dry heat in a suitable vessel or vessels to the desired temperature which would depend on the kind of seed or other material under treatment, and subjecting the same during cooking or heating to continuous stirring or agitation, the simultaneous cooking or heating by dry heat and stirring or agitation driving the moisture out of the seed or the like and producing the novel result of converting the seed or the like into a semi-liquid or similar state, this forming the first and essential step in our process. The semi-liquid or "sloppy mass" as we will call it, produced as before described, is then subjected to the action of a suitable separator by which the oil, or a very large percentage of the same is expelled or separated from the solid constituents, this forming the second and final step or stage of our process. The solid matter or residuum remaining, in which there still remains a small percentage of oil is then subjected to any further treatment deemed necessary for producing food for live stock, or a material for any purpose for which it may be suitable.

In order that our invention may be readily understood and carried into effect, we have appended hereunto two sheets of explanatory drawings of which Figure 1 represents an elevation of one form of apparatus for converting the seeds, nuts or the like, into a semi-liquid or sloppy mass, and for expelling or separating the oil from the solid constituents, and one form or type of apparatus for treating the residuum remaining after the oil has been expelled or separated by our process, and Fig. 2 is a similar view to Fig. 1 but showing another form or type of apparatus for extracting the oil, or some of the oil remaining in the residuum after oil has been expelled or separated by our process.

In carrying out our improved process, we employ a suitable cooking apparatus in which cooking or heating of the seeds, nuts or the like, is effected by means of dry heat, said cooking apparatus being provided with suitable stirring or agitating means and with means for raising the contents to the required temperature, thereby to free the oil from the seeds, nuts or the like, the cooking or heating and the stirring or agitating causing the conversion of the contents into a semi-liquid or sloppy mass which is essential for effecting the extraction or separation of the oil in accordance with our method or process.

We may employ any suitable apparatus for converting the seeds, nuts or the like to the consistency before mentioned, one arrangement for the purpose but which we describe by way of example only as we do not limit ourselves thereto, consisting of a jacketed conveyer of what is known as the paddle type, into the jacket of which steam or hot air from any suitable source of supply is delivered to provide the necessary dry heat for cooking or heating the contents, or of a plurality of such conveyers, the paddles or stirrers being so arranged and operated that they effect a thorough mixing and agitation of the material under treatment during its passage through the conveyer or conveyers.

One and a convenient arrangement of this type of apparatus is shown in the accompanying drawings, and consists of a plurality of jacketed trough-like conveyers A of the type mentioned arranged one above another and connected one with another by means of outlets $a$ after the manner of some forms of drying apparatus, the material being fed to the top conveyer, after traveling the full length of which it is delivered into the conveyer next below in order of arrangement, traveling first in one direction in one conveyer and then in the opposite direction in the conveyer next below until the bottom conveyer is reached, the aggregate length of the several conveyers being such that by the time the seeds, nuts or the like material under treatment has traversed the bottom one of the series of conveyers, it has, as a result of the cooking or heating by dry heat and the thorough stirring or agitation to which it has been simultaneously subjected, become semi-liquid or of the sloppy consistency required to allow of the ready extraction or separation of the oil from the solid constituents in the second step of our process.

The comminuted, crushed or ground seeds are fed to the top conveyer through an inlet or hopper $A^1$ which also serves as an outlet for the aqueous vapor or moisture which is expelled during the heating process.

The pipe for supplying the steam or hot air to the conveyers is indicated at B, said pipe having a connection to the jacket of each conveyer of the series, a drain or exhaust pipe by means of which the water resulting from the condensation of the steam supplied to the jackets of the conveyers, or by which the hot air after use, as the case may be, can escape, being indicated at C, the said pipe having a connection to the jacket of each conveyer of the series.

The blades or paddles for forcing the material along the conveyers and for causing the stirring or agitation of the same are indicated at D in the bottom conveyer of the series, and the shaft on which such paddles or blades are mounted is indicated at $D^1$.

In the arrangement of conveyers shown as forming the cooking or heating and stirring or agitating means, the shaft provided with blades in the top conveyer of the series is shown provided with a pulley E which is driven from a line of shafting or other source of power, said shaft driving the shaft in the conveyer next below in order of arrangement through the medium of a suitable toothed wheel F which gears with a corresponding wheel on the shaft of the said conveyer next below, the shafts of the remaining conveyers being driven the one by the other in like manner as will be readily understood on reference to the drawings.

The material in its semi-liquid or sloppy state is discharged from the bottom conveyer of the arrangement of conveyers forming the combined cooking or heating and agitating device in which it is converted into that state, or is transferred therefrom into a suitable centrifugal separator G or the equivalent, which effects the separation of the oil from the solid constituents of such semi-liquid or sloppy mass, $g$ indicating the pipe by which the separated oil passes away.

The solid matter or residuum remaining in the separator, with its remaining oil contents can then be subjected to any other suitable further treatment.

One example of further treatment of such residuum consists in subjecting it to pressure in the ordinary hydraulic presses H (see Fig. 1) for the purpose of expressing from it the oil, or some of the oil still remaining in it and forming the residuum into cakes for feeding live stock and for other purposes, the material before being put into the presses being, if desired, put into a kettle or cooker such as J and subjected to further heating and have the necessary moisture added to it as is the practice in the existing method of the extraction of oil from seeds and the like by means of pressure.

According to another mode, the oil remaining in the solid matter or residuum produced in the separator may be extracted by the well-known solvent process, in which case such solid matter or residuum, which would be in a hot dry state, would be delivered by the separator, or transferred therefrom to an extracting pot or pots K (see Fig. 2 of the accompanying drawings) in which it would be subjected to the action of a suitable solvent.

The number of pots employed would depend upon the quantity of material requiring to be treated, we prefer however to employ not less than two pots (three being the number shown in the accompanying drawings) so that the material in one pot, or in more than one pot, could be under treatment during the time the other pot or other pots is or are being emptied and filled.

Any known construction or type of extraction plant using any suitable solvent may be employed for extracting the oil remaining in the residuum and would only require the addition of a dry cooker and stirring or agitating device and centrifugal or other separator by the addition of which the output of the plant could be considerably increased.

A further advantage of our process is that the material being both hot and dry when delivered or transferred from the separator into the extraction pots is in an ideal condition for the easy extraction of the oil remaining in the residuum resulting from our process, by means of a solvent.

In describing our improved process in connection with vegetable and the like oleaginous seeds, nuts and the like, we include all products which can be satisfactorily treated by our said process.

We claim:—

A method of extracting oil from seeds and nuts similar to copra and palm kernels, which consists in first comminuting or grinding the seeds or nuts, then heating the comminuted material by the application of dry heat to a temperature sufficient to drive off the aqueous particles without volatilizing the oil, and simultaneously agitating or churning the material until it is converted into an oleaginous sloppy mass, and subsequently separating the oil from the solid matter in the mass.

In testimony whereof we affix our signatures in the presence of two witnesses.

CHARLES DOWNS.
ROBERT ASPLAND BELLWOOD.
THOMAS WILLOUGHBY TURNILL.

Witnesses:
ELSIE STUBBS,
LOUIS E. KIPPAX.